(12) United States Patent
Oi

(10) Patent No.: US 8,493,629 B2
(45) Date of Patent: Jul. 23, 2013

(54) IMAGE PROCESSING APPARATUS, METHOD, AND COMPUTER PROGRAM

(75) Inventor: Shunsuke Oi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 272 days.

(21) Appl. No.: 13/020,380

(22) Filed: Feb. 3, 2011

(65) Prior Publication Data

US 2011/0194154 A1    Aug. 11, 2011

(30) Foreign Application Priority Data

Feb. 9, 2010 (JP) ................. 2010-026265

(51) Int. Cl.
*H04N 1/40* (2006.01)

(52) U.S. Cl.
USPC ........................................ 358/3.28; 358/1.18

(58) Field of Classification Search
USPC ................ 358/3.28, 1.9, 2.1, 450, 1.18, 3.26, 358/3.24, 468, 406, 504; 382/100, 181, 190, 382/283–284, 257–258, 261, 266, 275
See application file for complete search history.

(56) References Cited

U.S. PATENT DOCUMENTS

| 6,580,806 | B1 * | 6/2003 | Sato |
| 6,954,541 | B2 * | 10/2005 | Fan et al. ................. 382/100 |
| 7,489,796 | B2 * | 2/2009 | Nakamura et al. .......... 382/100 |
| 7,777,859 | B2 * | 8/2010 | Zolla et al. ..................... 352/46 |

FOREIGN PATENT DOCUMENTS

| JP | 2007-094620 | | 4/2007 |
| JP | 2009111980 A | * | 5/2009 |

* cited by examiner

*Primary Examiner* — Thomas D Lee
*Assistant Examiner* — Stephen M Brinich

(57) ABSTRACT

An overlap determining unit determines whether or not it is difficult to read watermark characters by overlap between the watermark characters of the watermark image and pixels having a pixel value of the scan image equal to or more than a predetermined value using image data of a watermark image and image data of a scan image read by a scanner unit when the watermark image and the scan image area overlapped. A watermark image generating unit generates a correction watermark image obtained by correcting the watermark image to improve readability of the watermark characters when it is determined that it is difficult to read the watermark characters. A synthesis image generating unit generates a synthesis image in which the correction watermark image and the scan image are overlapped. A printer unit forms the synthesis image on a printing medium.

7 Claims, 8 Drawing Sheets

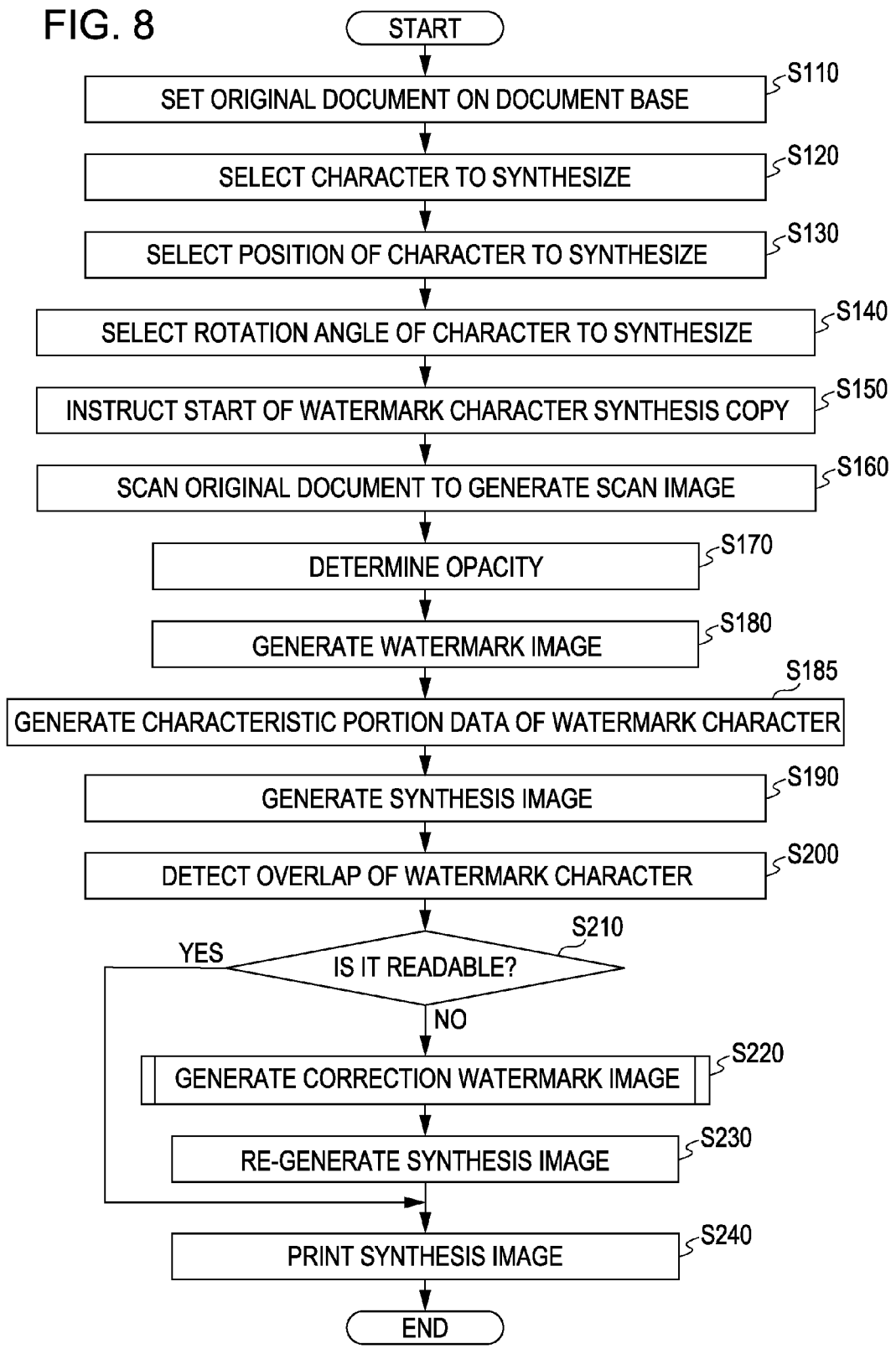

IMAGE PROCESSING APPARATUS, METHOD, AND COMPUTER PROGRAM

BACKGROUND

1. Technical Field

The present invention relates to watermark character synthesis copying of overlapping and printing watermark characters on an original image, and more particularly, to a technique of easily reading watermark characters.

2. Related Art

There exists a method for performing watermark character synthesis copying in relation to overlapping watermark characters, which are not in an original document, on a printed copy when copying a document (e.g. JP-A-2007-94620).

In the watermark character synthesis copying of the related art, a user designates the position of watermark characters synthesized at the start of copying, and the watermark characters are disposed at the position to print a synthesized image, thereby performing copying. In this case, the watermark characters may be overlapped with characters or the like in an original document, rendering it difficult to read the document. When there is a plurality of pages of the original document, there could be pages on which the watermark characters can be easily read and pages on which the watermark characters may not be easily read.

SUMMARY

An advantage of some aspects of the invention is to provide watermark character synthesis copying capable of easily reading watermark characters.

According to an aspect of the invention, there is provided an image processing apparatus including: a storage unit that stores first image data of a first image relating to watermark characters including one or more elemental characters; a determination unit that determines whether or not it is difficult to read the watermark characters due to overlap between the watermark characters of the first image and pixels having a pixel value of the second image equal to or more than a predetermined value using the image data of the first image and image data of a second image read by a scanner when the first image and the second image are overlapped; a generation unit that generates a third image obtained by correcting the first image to improve the readability of the watermark characters using the image data of the first image when the determination unit determines that it is difficult to read the watermark characters; and a synthesis unit that generates a synthesis image in which the second image and the third image are overlapped using the image data of the second image and the image data of the third image.

In the image processing apparatus, the determination unit may determine that it is difficult to read the watermark characters when a predetermined number or more of the pixels of intersection points and isolation points in the elemental characters of the watermark characters are overlapped with the pixels having the pixel value of the second image equal to or more than the predetermined value.

In the image processing apparatus, the determination unit may determine that it is difficult to read the watermark characters when a predetermined number or more of the pixels of intersection points and isolation points in the elemental characters of the watermark characters are overlapped with the pixels having the pixel value of the second image equal to or more than the predetermined value and when the number of pixels equal to or more than a predetermined ratio among all the pixels constituting the watermark characters are overlapped with the pixels having the pixel value of the second image equal to or more than the predetermined value.

In the image processing apparatus, the third image generated by the generation unit may be an image formed by adding additional watermark characters including one or more elemental characters which are the same as the watermark characters to the first image at a position other than that of the watermark characters in the first image.

In the image processing apparatus, when the scanner continuously reads a plurality of pages of the second image, the determination unit may determine whether or not it is difficult to read the watermark characters for each of the plurality of pages, and the generation unit may generate the third image obtained by correcting the first image to improve the readability of the watermark characters, for each page for which the determination unit determines that it is difficult to read the watermark characters.

BRIEF DESCRIPTION OF THE DRAWINGS

The invention will be described with reference to the accompanying drawings, wherein like numbers reference like elements.

FIG. 8 is a flowchart illustrating a process sequence of watermark character synthesis copying.

DESCRIPTION OF EXEMPLARY EMBODIMENTS

Hereinafter, an image processing apparatus according to an embodiment of the invention will be described with reference to the drawings.

Figure 1:
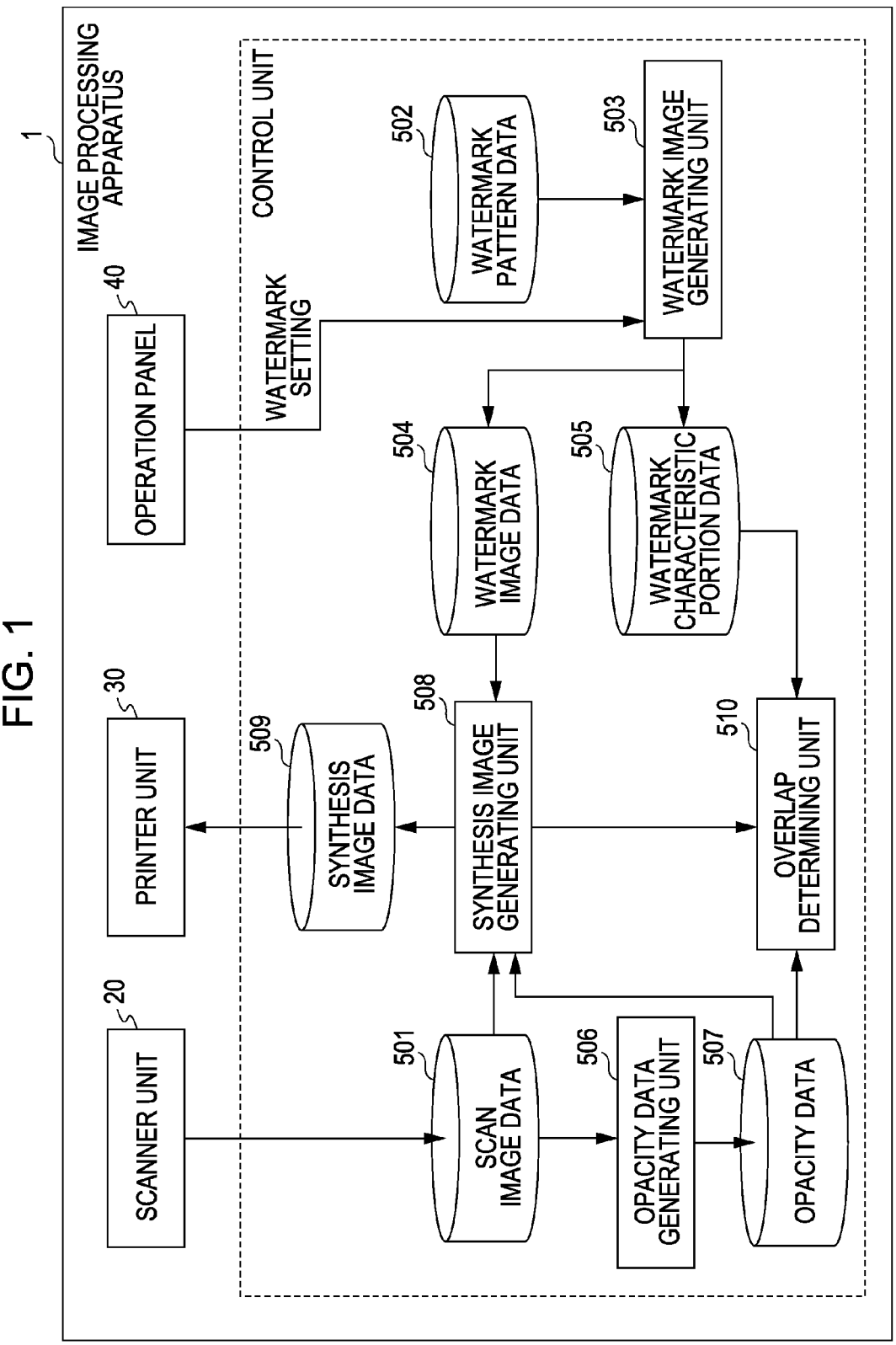
FIG. 1 is a diagram illustrating a configuration of an image processing apparatus according to an embodiment of the invention.

FIG. 1 is a diagram illustrating a configuration of an image processing apparatus 1 according to the embodiment. The image processing apparatus 1 according to the embodiment is provided with a scanner unit 20, a printer unit 30, an operation panel 40, and a control unit 50.

The image processing apparatus 1 is provided with a processor, a memory, and the like (not shown), and executes a predetermined computer program to realize the individual constituent elements or functions of the control unit 50 to be described below. All or a part of the program may be stored in a predetermined recording medium and distributed, or may be transmitted through a network.

The scanner unit 20 reads an image of an original document, and acquires image data (scan image data) of the image of the original document. For example, the image processing apparatus 1 has a document base (not shown), and the scanner unit 20 may scan the original document on the document base. The control unit 50 performs processes as described below on the basis of the scan image data read by the scanner unit 20.

The printer unit 30 forms an image on a printing medium according to an instruction from the control unit 50. For example, the printer unit 30 may be a printing mechanism such as an ink jet printer or a laser printer.

The control unit 50 is provided with a scan image data storing unit 501, a watermark pattern data storing unit 502, a watermark image generating unit 503, a watermark image data storing unit 504, a watermark characteristic portion data storing unit 505, an opacity data generating unit 506, an opacity data storing unit 507, a synthesis image generating unit 508, a synthesis image data storing unit 509, and an overlap determining unit 510.

The scan image data storing unit 501 stores the image data (scan image data) of the scan image (second image) read by the scanner unit 20. The scan image data storing unit 501 is, for example, a RAM having a capacity in which the image data of one page can be stored, and the values of the pixels of the scan image may be stored in the RAM.

The watermark pattern data storing unit 502 stores the image data of a watermark character pattern for generating a watermark image. The watermark character pattern is a pattern of watermark characters including one or more predetermined elemental characters, and may be, for example, "CONFIDENTIAL OUTSIDE COMPANY," "CONFIDENTIAL INSIDE COMPANY," "DO NOT COPY," "CONFIDENTIAL," or the like.

The watermark image generating unit 503 generates a watermark image (first image) relating to the watermark characters including one or more elemental characters. Image data of the watermark image generated by the watermark image generating unit 503 is stored in the watermark image data storing unit 504.

For example, the watermark image generating unit 503 generates the watermark image according to the watermark setting by a user receiving an input through the operation panel 40. The watermark setting includes, for example, the kind of watermark character pattern, the size of watermark character pattern, the printing position, the rotation angle, and the like.

Figure 2A:
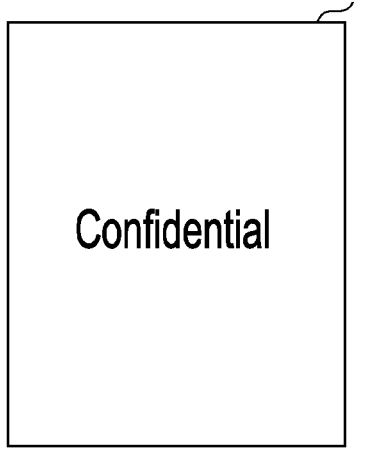
FIG. 2A to FIG. 2E are diagrams illustrating examples of a watermark image generated by a watermark image generating unit.
Figure 2B:
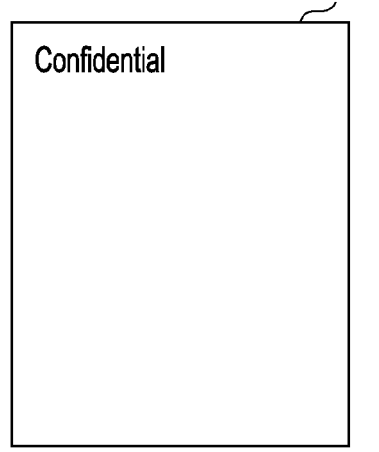
Figure 2C:
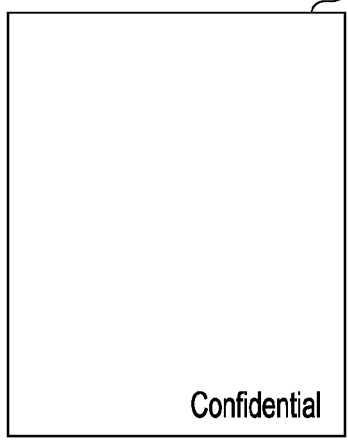
Figure 2D:
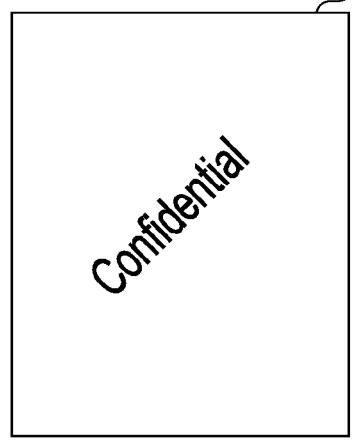

FIG. 2A to FIG. 2D show examples of the watermark images 100 (100a to 100d) generated by the watermark image generating unit 503. The examples shown in FIG. 2A to FIG. 2D are an example of the watermark image 100 when "Confidential" is selected as a kind of watermark character pattern in the watermark setting. FIG. 2A, FIG. 2B, and FIG. 2C show examples of the watermark images 100a to 100c when printing positions are "center", "left up", and "right down" and character sizes are "large", "standard", and "standard" in the watermark setting. FIG. 2D shows an example of the watermark image 100d when a printing position is "center", a character size is "large", and the rotation angle is "anticlockwise 45°" in the watermark setting.

When the overlap determining unit 510 determines that it is difficult to read the watermark characters (details will be described below), the watermark image generating unit 503 generates a correction watermark image (third image) obtained by correcting the watermark image to improve the readability of the watermark characters using the image data (watermark image data) of the watermark image (first image) and image data (scan image data) of the scan image (second image). The image data of the correction watermark image is also stored in the watermark image data storing unit 504.

The correction watermark image (third image) may be an image formed by adding additional watermark characters including one or more elemental characters which are the same as the watermark characters to the watermark image (first image) at a position other than that of the watermark characters in the watermark image.

Figure 2E:
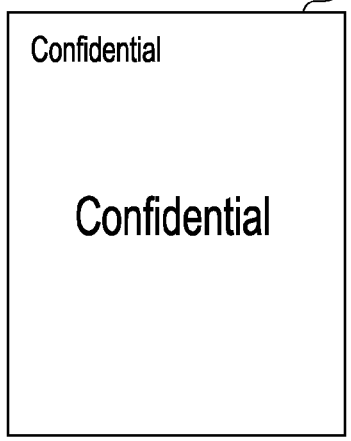

For example, FIG. 2E shows an example of the correction watermark image 110. As shown in FIG. 2E, the correction watermark image 110 is an image in which the additional watermark characters with a character size of "standard" at "left up" are added to the watermark image 100a having watermark characters with a character size of "large" at "center". In addition, for example, the correction watermark image 110 may be an image in which any one or more of the position, the size, and the direction of the watermark characters of the watermark image 100 is changed, and may be an image in which additional watermark characters are combined with them.

The watermark image generating unit 503 may generate the correction watermark image, for example, in the following manner. That is, the watermark image generating unit 503 selects a position with the smallest overlap with an area in which opacity in the scan image is equal to or less than a predetermined threshold value (i.e., a pixel value of the scan image is equal to or less than a predetermined threshold value) among watermark positions which are not selected for the watermark setting, using the opacity data (see FIG. 5A and FIG. 5B, details will be described later). The additional watermark characters may be disposed at the selected watermark position to obtain the correction watermark image. Alternatively, the watermark image generating unit 503 may search a rectangular area in which opacity in the scan image is equal to or less than a predetermined threshold value using the opacity data. The watermark image generating unit 503 may dispose the additional watermark characters at a position on the watermark image corresponding to the position of the rectangular area to obtain the correction watermark image.

When a plurality of pages are continuously read by the scanner unit 20, the watermark image generating unit 503 may generate the correction watermark image for each page for which the overlap determining unit 510 determines that it is difficult to read the watermark characters.

Referring to FIG. 1 again, the watermark image data storing unit 504 stores image data of the watermark image or the correction watermark image generated by the watermark image generating unit 503. The watermark image data storing unit 504 is formed of, for example, a RAM, and may store pixel values of the watermark image or the correction watermark image in the RAM.

The watermark image generating unit 503 extracts the characteristic portions of the generated watermark image or the correction watermark image. For example, the watermark image generating unit 503 extracts characteristic portions of characters constituting the watermark characters or additional watermark characters included in the watermark image or the correction watermark image. The characteristic portions of the characters may be intersection points or isolation points in the elemental characters.

Figure 3A:
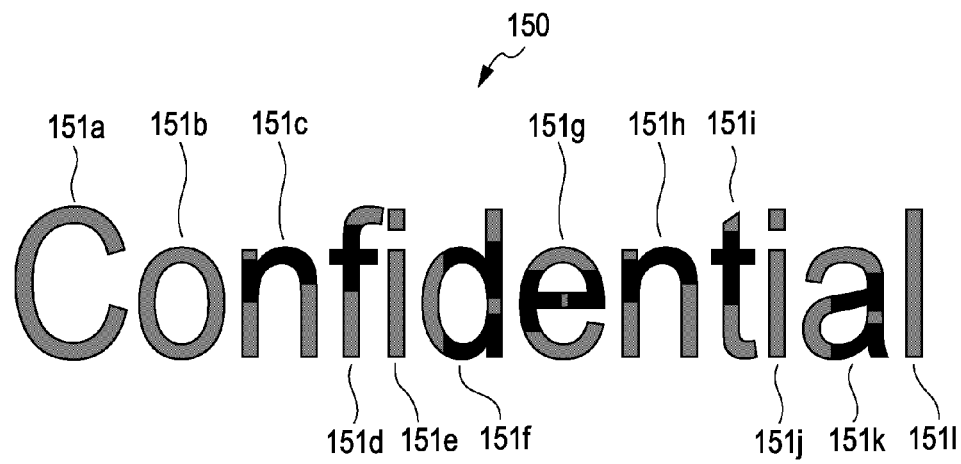
FIG. 3A and FIG. 3B are diagrams illustrating watermark characters and characteristic portions of the watermark characters.
Figure 3B:
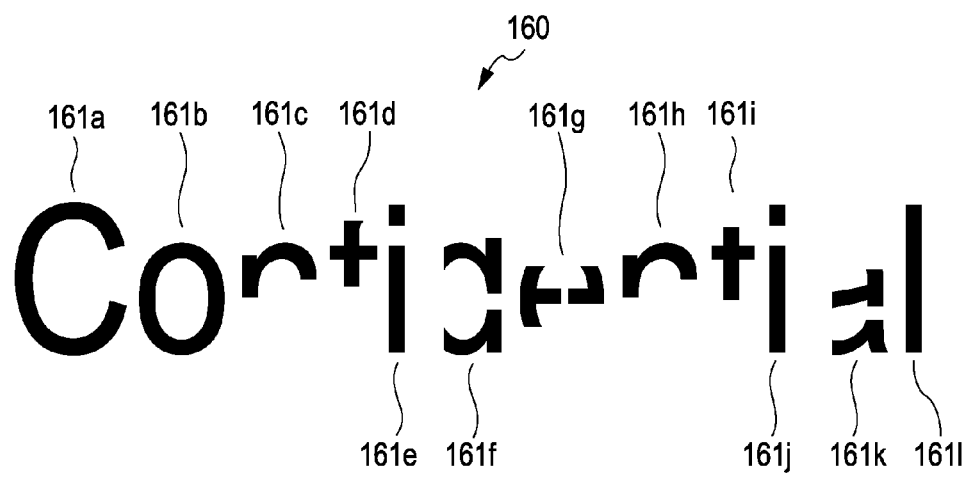

FIG. 3A and FIG. 3B are diagrams illustrating the watermark characters and the characteristic portions of the watermark characters.

FIG. 3A is an enlarged diagram of "Confidential" that are the watermark characters 150. FIG. 3B shows the characteristic portion 160 of the watermark characters 150. The characteristic portion 160 is formed by extracting characteristic portions 161a to 161l from the intersection points of the strokes constituting each of the characters 151a to 151l of "Confidential" of the watermark characters 150 and the isolation points which do not intersect with the other strokes. The characteristic portion is applied to the additional watermark characters in the same manner.

The watermark image generating unit 503 extracts the pixels of the intersection points and the isolation points of the watermark characters or the additional watermark characters, and specifies positional coordinates of the extracted pixels in the watermark image or the correction watermark image. The watermark image generating unit 503 stores a bitmap indicating the positional coordinates in the watermark characteristic portion data storing unit 505.

Figure 4B:
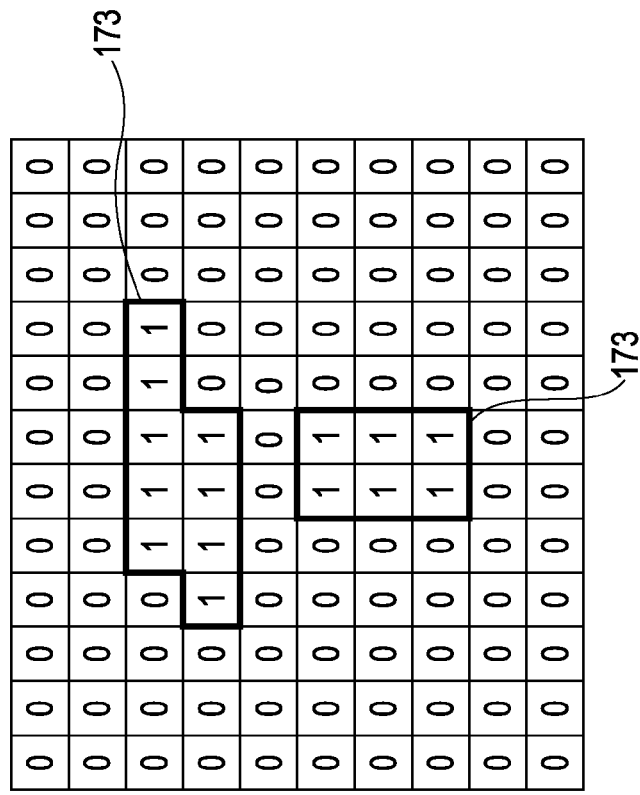
FIG. 4A and FIG. 4B are diagrams illustrating a characteristic portion of a watermark character.
Figure 4A:
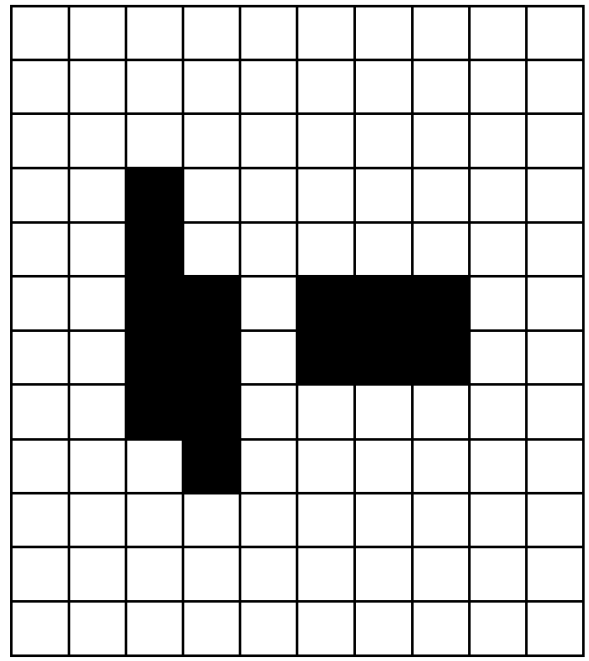

FIG. 4A is an enlarged diagram illustrating the characteristic portion 160 of the watermark characters, and FIG. 4B is the bitmap 170 indicating the distribution of the characteristic portion 160 of the watermark characters. That is, when the intersection points and the isolation points of the watermark characters or the additional watermark characters are distributed as shown in FIG. 4A, the bitmap 170 indicating the distribution state thereof is shown in FIG. 4B.

The watermark characteristic portion data storing unit 505 is, for example, a RAM, and the bitmap 170 as shown in FIG. 4B is stored in the RAM.

The image data of the characteristic portion 160 of FIG. 3B may be stored in advance in the watermark pattern data storing unit 502 with the watermark character pattern. The watermark image generating unit 503 may extract the characteristic portion data from the watermark pattern data storing unit 502 on the basis of the above-described watermark setting and determine a position and a rotation angle to specify positional coordinates in which the characteristic portions are distributed.

Referring to FIG. 1 again, the opacity data generating unit 506 generates opacity data indicating the opacity of the scan image. The opacity data is stored in the opacity data storing unit 507.

Herein, the opacity is an indicator indicating how much to display a target image with respect to the other image with priority when the other image is overlapped with the target image. The opacity is determined by a value in the range in which a ratio of displaying pixel values of the target image is 0% to 100%, for example, for each pixel. This is the same way of thinking as a channel. The opacity data generating unit 506 determines the opacity such that parts such as characters, objects, or photographs included in the scan image are printed on the front face.

Figure 5B:
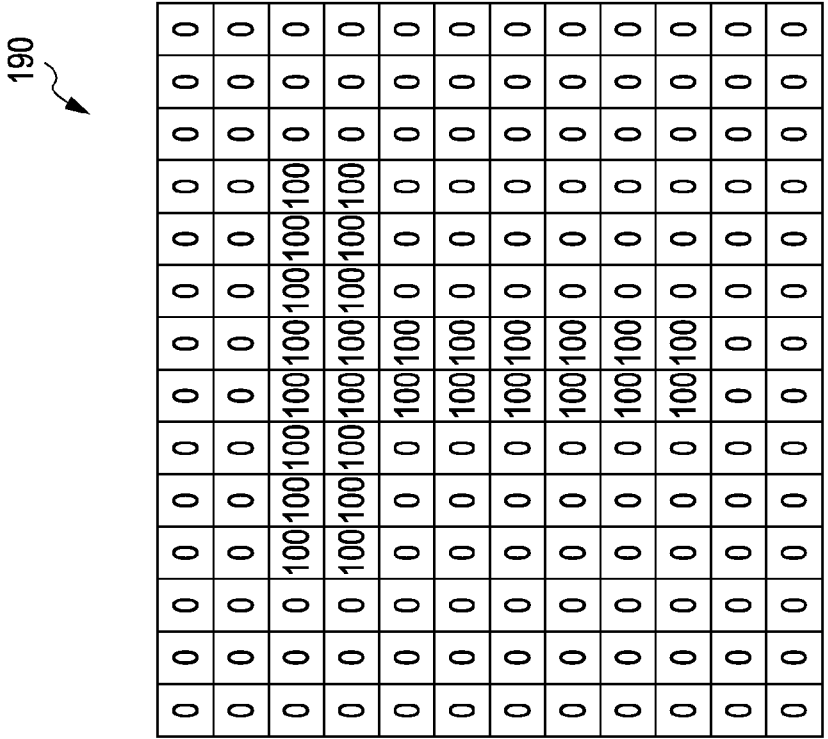
FIG. 5A and FIG. 5B are diagrams illustrating opacity.
Figure 5A:
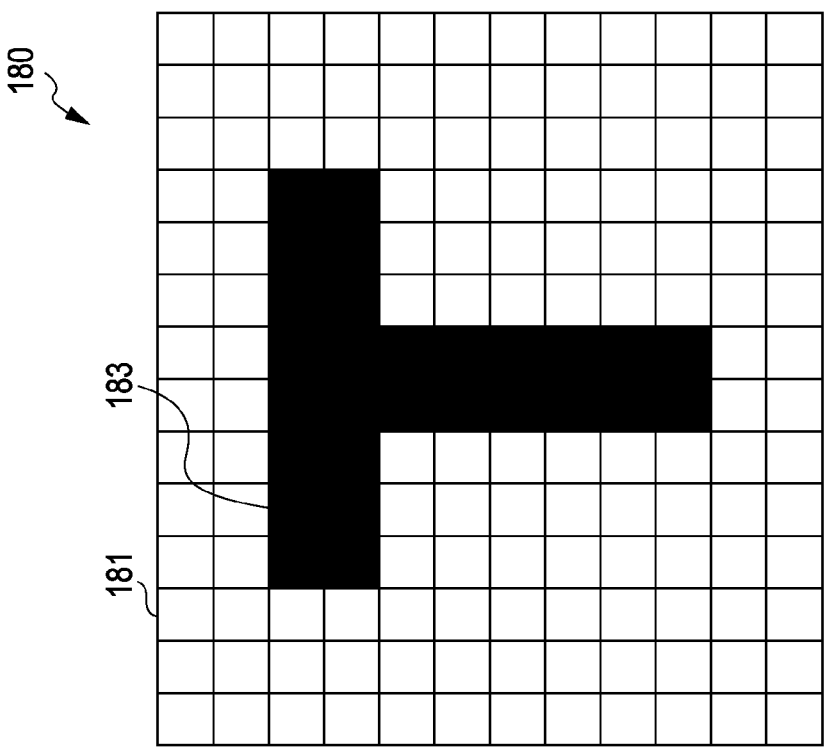

FIG. 5A and FIG. 5B are diagrams illustrating the opacity in the embodiment.

FIG. 5A is an enlarged diagram of the scan image 180, and the character "T" is formed by pixels (black pixels) 183 having a predetermined pixel value with respect to pixels (white pixels) 181 having a pixel value of 0. FIG. 5B is the opacity data 190 of the FIG. 5A.

For example, in the embodiment, the opacity data generating unit 506 generates the opacity data by binarizing the scan image 180 shown in FIG. 5A into the pixels (black pixels) 183 having a pixel value equal to or more than a predetermined threshold value and the other pixels (white pixels) 181 having a pixel value less than the predetermined threshold value. That is, the opacity data generating unit 506 generates a bitmap as the opacity data 190 in which the opacity of the pixels having the pixel value equal to or more than the predetermined threshold value is 100% and the opacity of the pixels having the pixel value less than the predetermined threshold value is 0%. The bitmap is stored as the opacity data 190 in the opacity data storing unit 507. The opacity data generating unit 506 may set opacity values of between 0 and 100 according to the pixel value.

Returning to FIG. 1, the synthesis image generating unit 508 generates a synthesis image in which the watermark image and the scan image are overlapped using the image data (watermark image data) of the watermark image (first image) and the image data of the scan image (second image) read by the scanner 20. The synthesis image generating unit 508 generates a synthesis image in which the correction watermark image (third image) and the scan image are overlapped when correction of the watermark image is necessary. The synthesis image data of the synthesis image generated by the synthesis image generating unit 508 is stored in the synthesis image data storing unit 509.

The synthesis image generating unit 508 generates a synthesis image by adding pixel values of the scan image 180 or the watermark image 100 for each pixel on the basis of the opacity data 190. For example, in the embodiment, the synthesis image generating unit 508 first determines the values of the pixels of the synthesis image on the basis of the scan image data of the scan image data storing unit 501 such that the scan image 180 is the front face. For example, in the embodiment, the synthesis image generating unit 508 adds the pixel value of the watermark image data of the watermark image data storing unit 504 to the pixel value of the synthesis image for the pixels having the opacity of 0% with reference to the opacity data 190 of the opacity data storing unit 507. Meanwhile, the synthesis image generating unit 508 adds the pixel value of the scan image data for the pixels having the opacity of 100%, and does not add the pixel value of the watermark image data. Accordingly, the pixels having the opacity of 100% come to have only the pixel value of the scan image data, whereby the scan image is displayed on the front face of the watermark image. The same is applied when synthesizing the correction watermark image 110 with the scan image 180.

The synthesis image data storing unit 509 stores the synthesis image data. The synthesis image data storing unit 509 is, for example, a RAM having a capacity capable of storing one page of image data, and the values of the pixels of the synthesis image may be stored in the RAM.

The overlap determining unit 510 determines whether or not it is difficult to read the watermark characters due to the overlap between the watermark characters of the watermark image and the pixels having a pixel value of the scan image equal to or more than a predetermined value, when the watermark image (first image) and the scan image (second image) are overlapped.

Figure 6:
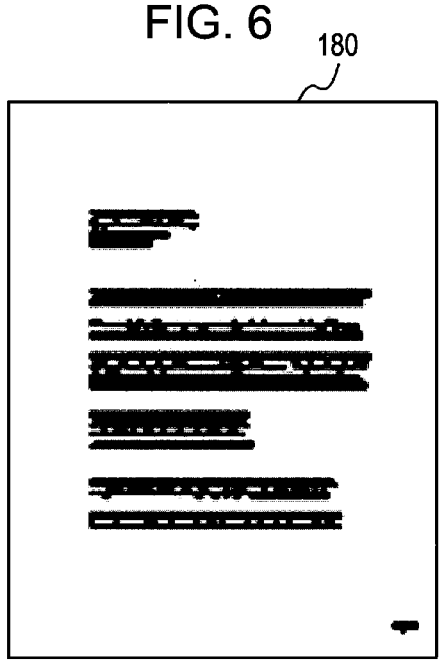
FIG. 6 is a diagram illustrating an example of a scan image.
Figure 7A:
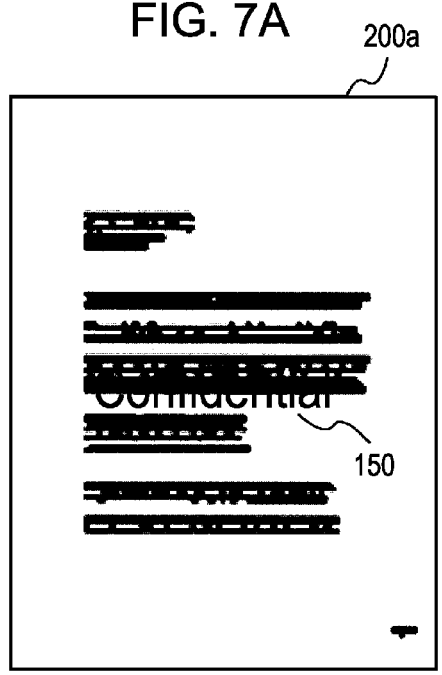
FIG. 7 is a diagram illustrating an example of a synthesis image.
Figure 7B:
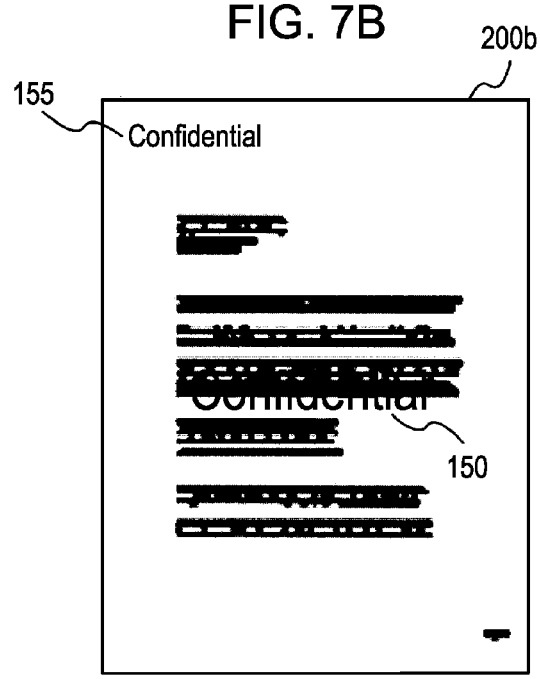

FIG. 6 shows an example of the scan image 180, and FIG. 7A and FIG. 7B show an example of the synthesis image 200.

The synthesis image 200 shown in FIG. 7A is an image which can be obtained when the synthesis image generating unit 508 synthesizes the watermark image 100a shown in FIG. 2A with the scan image 180 shown in FIG. 6 according to the above-described sequence. In the synthesis image 200, the overlap determining unit 510 determines whether or not the watermark characters are readable.

For example, when a predetermined number or more of the pixels of the intersection points and the isolation points in the elemental characters in the watermark characters are overlapped with the pixels having a pixel value of the scan image (second image) equal to or more than a predetermined value, the overlap determining unit 510 may determine that it is difficult to read the watermark characters.

That is, the overlap determining unit 510 first specifies the positional coordinates of the characteristic portion 160 with reference to the characteristic portion data of the watermark characteristic portion data storing unit 505. For example, the overlap determining unit 510 searches for a pixel having a pixel value of "1" while scanning rightward from a left up pixel as an origin in the bitmap shown in FIG. 4B of the characteristic portion data 170 shown in FIG. 4B. When reaching the right end, the detection is performed in the same manner as above by one step. When a pixel having a pixel value of "1" is detected, the overlap determining unit 510 detects a pixel having the pixel value of "1" of the adjacent pixels above, below, to the left, and to the right, and specifies the positional coordinates of an area of an intersection point or an isolation point. The positional information is stored as a positional coordinate group 173 indicating the area of one intersection point or isolation point. Hereinafter, in the same manner, the positional coordinate group 173 indicating the entire area of the intersection points and isolation points is detected.

Next, the overlap determining unit 510 extracts the opacity of the same positional coordinates as the position coordinate group 173 detected herein with reference to the opacity data 190 (FIG. 5B).

For example, the overlap determining unit 510 selects a set of positional coordinates of the positional coordinate group 173 detected by the above-described process with reference to the opacity data storing unit 507, and specifies the opacity of the position corresponding to the positional coordinates. For example, when the specified opacity is equal to or more than a predetermined threshold value (e.g., 90% or more), the scan image 180 having a pixel value equal to or more than a predetermined value in the positional coordinates exists. Accordingly, the characteristic portions of the watermark characters, that is, the intersection points or the isolation points, are hidden. Therefore, the overlap determining unit 510 calculates a ratio of pixels overlapped with pixels having a pixel value of the scan image 180 equal to or more than a predetermined value among all the pixels of the characteristic portions 160 of the watermark characters.

The overlap determining unit 510 repeatedly performs this process on all the pixels of the positional coordinate group 173 relating to the intersection points or the isolation points to count the number of overlapped pixels in the intersection points or the isolation points of the watermark characters. When the number of overlapped pixels is equal to or more than a predetermined ratio of the number of all pixels of the intersection points or the isolation points of the watermark characters, it is determined that it is difficult to read the watermark characters. In this case, the threshold value may be changed according to the importance of the watermark characters.

In addition, as another aspect, the overlap determining unit 510 may determine that it is difficult to read the watermark characters when a predetermined number or more of the pixels of the intersection points and the isolation points in the elemental characters of the watermark characters are overlapped with the pixels having the pixel value of the scan image (second image) equal to or more than the predetermined value and when a number of pixels equal to or more than a predetermined ratio among the all the pixels constituting the watermark characters are overlapped with the pixels having the pixel value of the second image equal to or more than the predetermined value. That is, it may be determined whether or not it is difficult to read the watermark characters according to the ratio of overlapped pixels among all the pixels of the watermark characters with the overlapping degree of the intersection points or the isolation points of the watermark characters.

When the scanner unit 20 continuously reads a plurality of pages of the scan image (second image), the overlap determining unit 510 determines whether or not it is difficult to read the watermark characters for each of the plurality of pages.

FIG. 8 is a flowchart illustrating a process sequence when watermark character synthesis copying is performed using the image processing apparatus 1 according to the embodiment.

First, a user sets an original document on a document base (S110).

The user operates the operation panel 40 to input the watermark setting (S120 to S140). That is, the user performs selection of the watermark characters synthesized with the original document (S120), selection of the position for synthesizing the watermark characters (S130), and selection of the rotation angle of the watermark characters (S140). The user instructs the image processing apparatus 1 to start the watermark character synthesis copying (S150).

First, the scanner unit 20 receives the instruction to start the watermark character synthesis copying, and scans the original document on the document base to generate a scan image (S160). The image data of the scan image generated herein is stored in the scan image data storing unit 501.

The opacity data generating unit 506 determines the opacity on the basis of the scan image data of the scan image data storing unit 501 (S170). The opacity data relating to the opacity is stored in the opacity data storing unit 507.

The watermark image generating unit 503 generates a watermark image according to the watermark setting (S180). The image data of the watermark image is stored in the watermark image data storing unit 504. In addition, the watermark image generating unit 503 extracts the characteristic portions of the watermark characters included in the watermark image, and generates characteristic portion data of the watermark characters indicating the positional coordinates of the characteristic portions in the watermark image (S185). The characteristic portion data is stored in the watermark characteristic portion data storing unit 505.

The synthesis image generating unit 508 synthesizes the scan image data of the scan image data storing unit 501 and the watermark image data of the watermark image data storing unit 504 to generate the synthesis image data (S190). The synthesis image data is stored in the synthesis image data storing unit 509.

The overlap determining unit 510 detects the overlap of the watermark characters in the synthesis image (S200), and determines whether or not the watermark characters are readable (S210). For example, as described above, the overlap determining unit 510 determines whether or not the watermark characters are readable according to the extent that the characteristic portions (the intersection points and the isolation points) of the watermark characters are overlapped with the pixels having a pixel value of the scan image equal to or more than a predetermined value.

When the overlap determining unit 510 determines that the watermark characters are readable (S210: Yes), the following steps S220 and S230 are skipped, the printer unit 30 prints the synthesis image on the basis of the synthesis image data of the synthesis image data storing unit 509 (S240).

When the overlap determining unit 510 determines that it is difficult to read the watermark characters (S210: No), the watermark image generating unit 503 generates a correction watermark image (S220). The generation of the correction watermark image will be described in detail later.

The synthesis image generating unit 508 synthesizes the scan image data of the scan image data storing unit 501 and the image data of the correction watermark image generated in the step S220 to regenerate synthesis image data (S230).

The regenerated synthesis image data is stored in the synthesis image data storing unit 509.

The printer unit 30 prints the synthesis image on the basis of the synthesis image data of the synthesis image data storing unit 509 (S240).

When a plurality of pages is continuously copied, the step 160 and the subsequent steps are repeatedly performed for each page.

Figure 9:
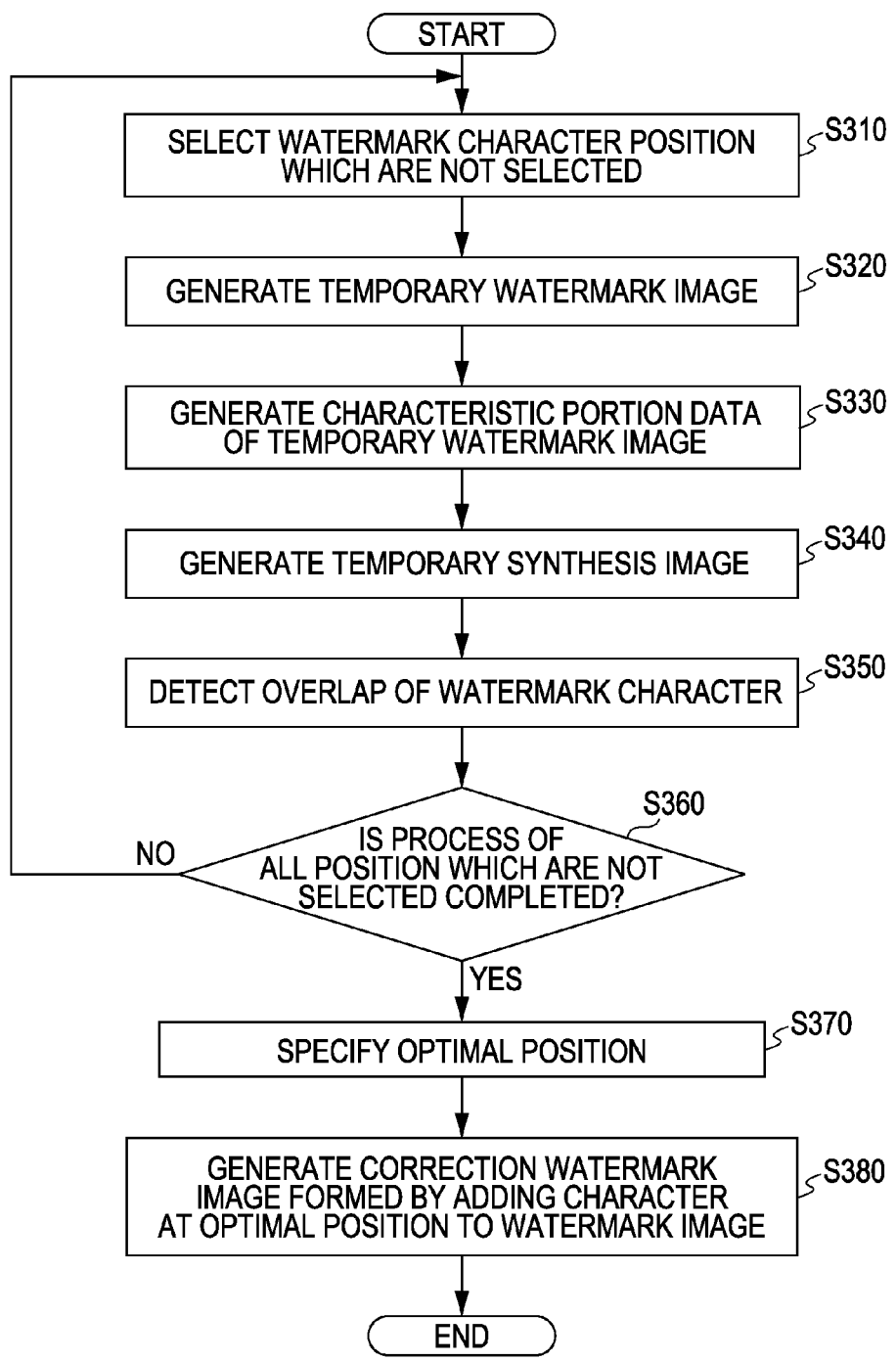
FIG. 9 is a flowchart illustrating a process sequence of correction watermark image generation.

FIG. 9 is a flowchart illustrating a detailed process sequence of the generation of the correction watermark image in the step S220. In the process, a position with the smallest overlap is determined among the positions of the watermark characters which are not selected for the watermark setting designated by the user, and the additional watermark characters are added to the determined position.

The watermark image generating unit 503 first selects one of the positions of the watermark characters which are not selected for the watermark setting (S310). The watermark image generating unit 503 generates a temporary watermark image in which the watermark characters are disposed at the selected position (S320). The watermark image generating unit 503 extracts the characteristic portion of the watermark image with respect to the temporary watermark image, and generates the characteristic portion data (S330).

The synthesis image generating unit 508 synthesizes the scan image data of the scan image data storing unit 501 and the image data of the temporary watermark image generated in the step S320 to generate a temporary synthesis image (S340).

The overlap determining unit 510 detects the overlap of the watermark characters in the temporary synthesis image (S350).

The process is performed on all the positions of the watermark characters which are not selected for the watermark setting (S360).

The overlap determining unit 510 specifies a watermark character position with the smallest overlap herein, as an optimal position (S370).

The watermark image generating unit 503 generates a correction watermark image in which the additional watermark characters are disposed at the optimal position determined herein on the original watermark image (S380).

According to the embodiment, even when the watermark characters are covered by the scan image and are hardly readable, the additional watermark characters are displayed at a position where the watermark characters are easily readable. Accordingly, the user can reliably read the watermark characters in copies to which the watermark characters generated by the embodiment are attached.

When a plurality of pages are continuously copied, the step S160 and the subsequent steps are applied to each page. That is, the process of the flowchart of FIG. 9 is performed for each page, and thus the position of the watermark characters added to the correction watermark image is different for each page. Meanwhile, for the same correction watermark image, the watermark characters at the position designated with the watermark setting by the user remain without being deleted.

As a result, in copies of a plurality of pages to which the watermark characters generated by the embodiment are added, the watermark characters will definitely be at the position designated by the watermark setting for all the copies whether the additional watermark characters are present or absent, even if the position is different for each page. For this reason, even when the additional watermark characters are added, the overall consistency of the plurality of pages is not impaired.

The above-described embodiment of the invention is an example to describe the present invention, and the scope of the invention is not limited to only the embodiment. A person skilled in the art can embody the invention in various aspects without deviating from the main concept of the invention.

For example, in the embodiment, the scan image is overlapped to be disposed on the front face of the watermark image, but on the contrary, the watermark image may be overlapped to be disposed on the front face of the scan image. In the embodiment, the opacity data is generated from the scan image and the overlap of the scan image and the watermark image is determined, but the scan image and the watermark image may be directly compared without using the opacity data.

The entire disclosure of Japanese Patent Application No. 2010-26265, filed Feb. 9, 2010 is expressly incorporated by reference herein.

What is claimed is:

1. An image processing apparatus comprising:
   a storage unit that stores an image data of a first image relating to watermark characters including one or more elemental characters;
   a determination unit that determines whether or not it is difficult to read the watermark characters due to overlap between the watermark characters of the first image and pixels having a pixel value of a second image equal to or more than a predetermined value using the image data of the first image and image data of the second image read by a scanner when the first image and the second image are overlapped;
   a generation unit that generates a third image obtained by correcting the first image to improve readability of the watermark characters using the image data of the first image when the determination unit determines that it is difficult to read the watermark characters; and
   a synthesis unit that generates a synthesis image in which the second image and the third image are overlapped using the image data of the second image and the image data of the third image.

2. The image processing apparatus according to claim 1, wherein the determination unit determines that it is difficult to read the watermark characters when a predetermined number or more of pixels of intersection points and isolation points in the elemental characters of the watermark characters are overlapped with the pixels having the pixel value of the second image equal to or more than the predetermined value.

3. The image processing apparatus according to claim 1, wherein the determination unit determines that it is difficult to read the watermark characters when a predetermined number or more of pixels of intersection points and isolation points in the elemental characters of the watermark characters are overlapped with the pixels having the pixel value of the second image equal to or more than the predetermined value and when a number of pixels equal to or more than a predetermined ratio among all the pixels constituting the watermark characters are overlapped with the pixels having the pixel value of the second image equal to or more than the predetermined value.

4. The image processing apparatus according to claim 1, wherein the third image generated by the generation unit is an image formed by adding additional watermark characters including one or more elemental characters which are the same as the watermark characters to the first image at a position other than that of the watermark characters in the first image.

5. The image processing apparatus according to claim 1, wherein when the scanner continuously reads a plurality of pages of the second image, the determination unit determines whether or not it is difficult to read the watermark characters for each of the plurality of pages, and the generation unit generates the third image obtained by correcting the first image to improve readability of the watermark characters, for each page for which the determination unit determines that it is difficult to read the watermark characters.

6. An image processing method performed by an image processing apparatus provided with an image forming unit forming an image read by a scanner on a printing medium, comprising:

- determining whether or not it is difficult to read watermark characters due to overlap between the watermark characters of a first image and pixels having a pixel value of a second image equal to or more than a predetermined value using image data of the first image relating to the watermark characters including one or more elemental characters and image data of the second image read by the scanner when the first image and the second image are overlapped;
- generating a third image obtained by correcting the first image to improve readability of the watermark characters using the image data of the first image when it is determined that it is difficult to read the watermark characters by the determination; and
- generating a synthesis image in which the second image and the third image are overlapped using the image data of the second image and the image data of the third image.

7. A non-transitory recording medium in which a computer program executed by an image processing apparatus provided with an image forming unit forming an image read by a scanner on a printing medium is recorded, the computer program causing the image processing apparatus to execute:

- determining whether or not it is difficult to read watermark characters due to overlap between the watermark characters of a first image and pixels having a pixel value of a second image equal to or more than a predetermined value using image data of the first image relating to the watermark characters including one or more elemental characters and image data of the second image read by the scanner when the first image and the second image are overlapped;
- generating a third image obtained by correcting the first image to improve readability of the watermark characters using the image data of the first image when it is determined that it is difficult to read the watermark characters by the determination;
- generating a synthesis image in which the second image and the third image are overlapped using the image data of the second image and the image data of the third image; and
- printing the synthesized synthesis image on the image forming unit.

* * * * *